Oct. 20, 1953
B. McMILLAN
2,656,460
BIDIRECTIONAL COUNTER
Filed Oct. 28, 1949
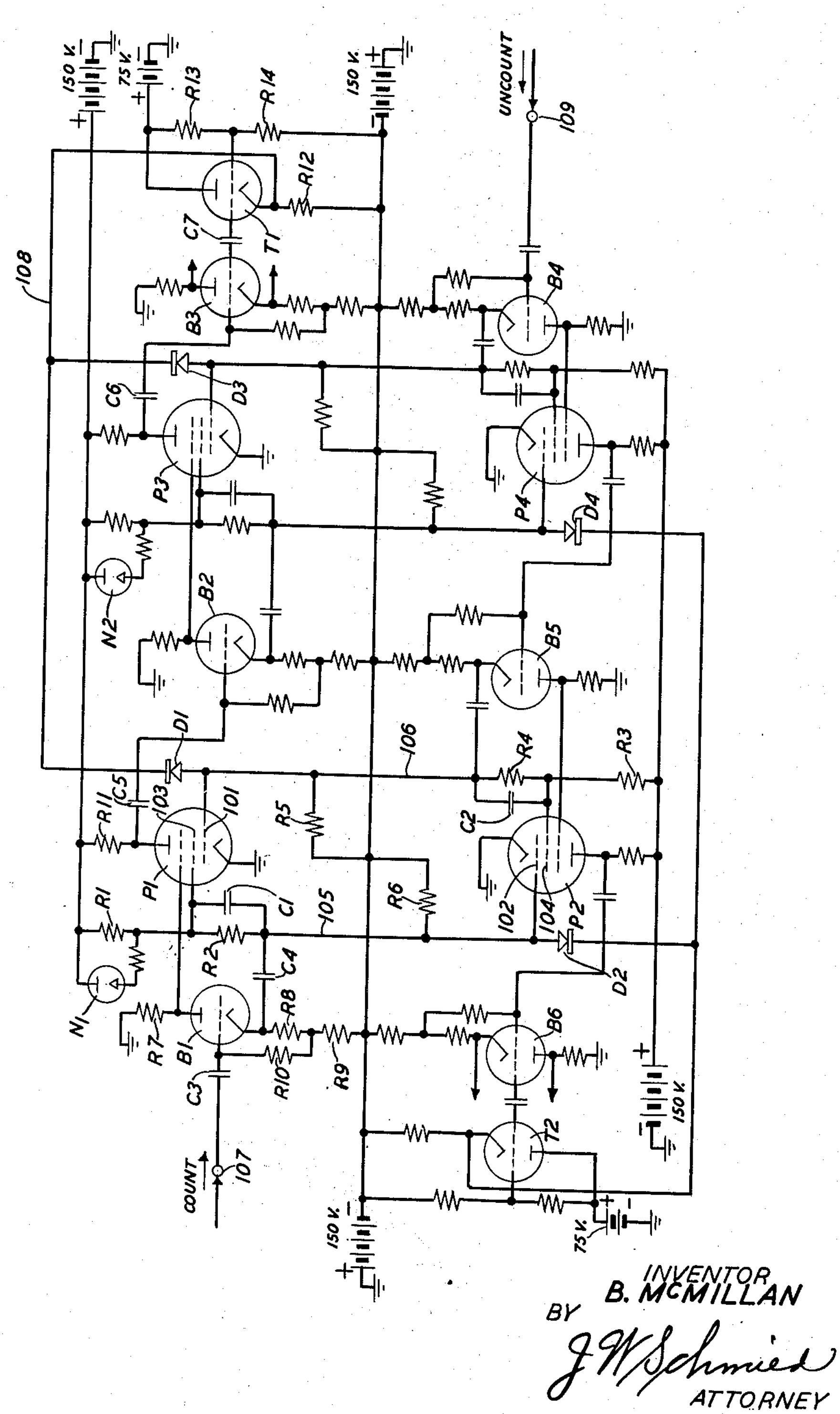
INVENTOR
B. McMILLAN
BY J W Schmied
ATTORNEY Patented Oct. 20, 1953 2,656,460

UNITED STATES PATENT OFFICE 2,656,460

BIDIRECTIONAL COUNTER

Brockway McMillan, Summit, N. J., assignor to Bell Telephone Laboratories, Incorporated, New York, N. Y., a corporation of New York Application October 28, 1949, Serial No. 124,195

15 Claims. (Cl. 250—27)

This invention relates to counting means and more particularly to electronic counting circuits capable of bidirectional operation.

An object of this invention is to provide an electronic counting circuit operative either to add or subtract, i. e., either to count or uncount.

Another object of this invention is to furnish an electronic counting circuit readily modifiable to count on any selected base.

A further object of this invention is to provide a bidirectional counting circuit capable of counting physical phenomena occurring at high rates of speed without the necessity of delay networks and without requiring incoming pulses to perform interval switching.

These objects have been accomplished in the preferred embodiment of the invention by providing a plurality of sets of trigger circuits or "flip-flops" each comprising a pair of electron discharge devices. Each of these pairs is initially set in a certain state. A pulse to be counted is amplified and applied so as to reverse the state of the first trigger circuit. This operation not only registers the first count but also opens an electronic gate circuit comprising elements of the then-conducting electron discharge device. The next pulse to be counted is then transmitted through this gate, amplified, and applied to reverse the state of the next succeeding trigger circuit. Means are provided operative in response to a pulse transmitted through the gate of the last trigger circuit in any one stage to reset all flip-flops in that stage. The circuits are arranged to be fully symmetrical whereby they are responsive to pulses to be subtracted or "uncounted" in a manner similar but exactly opposite to that in which they respond to additive pulses. The circuits comprise a repetition of a few simple substructures and a counter for any suitable scale may readily be contrived by a selection of the proper number of substages.

The invention may be more fully understood from the following detailed description of the invention, with reference to the accompanying drawing showing a preferred embodiment of the invention. The drawing discloses one stage of a counter for the scale of three. As will be noted from the ensuing description, the circuits may readily be contracted or expanded to count on any desired base. For example, the addition of seven more pairs of counting tubes and associated circuits will provide a system operative to count decimally. It will further be noted that the circuit is perfectly symmetrical as between additive and subtractive counts. In fact, the diagram of Fig. 1 may be rotated 180 degrees without change.

The basic circuit utilized in the present counter is a modification of the well-known Eccles-Jordan trigger circuit as disclosed in British Patent 148,582, accepted August 5, 1920, and as shown in a variety of forms in "Theory and Applications of Vacuum Tubes" by Herbert J. Reich. An elementary form of that trigger circuit comprises two triodes in which the control grid of each tube is coupled to the anode of the other tube through a parallel-connected resistance-capacitance network. The cathodes of the tubes are normally grounded, while suitable operating grid and anode voltages are supplied through resistors individual to those electrodes. If a negative voltage be momentarily applied to the grid of the first triode, the anode current of that tube will be reduced whereby the anode potential will rise due to the reduced potential drop across the plate resistor. This rise in anode potential is communicated, through the coupling resistor, to the grid of the second triode, causing an increase in the plate current of the second tube. The plate voltage of the second triode will be reduced as a result of the increased potential drop across its plate resistor, and this decrease in potential will be applied, through the coupling resistor, to the control grid of the first triode. This action is cumulative, continuing until the first triode is cut off. The circuit is stable in this condition until a negative pulse is applied to the control grid of the conducting triode (or a positive pulse to the control grid of the non-conducting triode) which will initiate a transfer to the opposite stable state wherein the first triode is rendered conductive and the second triode is cut off.

In each stage of the electronic counter herein disclosed, one less pair of trigger tubes is employed than the counting base. In the depicted embodiment, an exemplary scale of three has been used with two trigger circuits being provided. For a purpose hereinafter to be discussed, pentodes P1 and P2 are employed as the tube elements of one substage and pentodes P3 and P4 are employed as the tube elements of the next succeeding substage. These pentodes should be of a type, such as the 6AS6, in which all grids are available for use. Three elements of each tube are employed as a triode section, and circuitry is associated with these electrodes of each pentode pair to provide a trigger circuit. In the pentodes P1 and P2, the cathodes are grounded, the first grids 101 and 102 are employed as the control grids of the tride sections, and the second grids 103 and 104, normally employed as screen grids, are utilized as the anodes of the triode sections. The "triode-section" plate 103 of pentode P1 is connected to a positive 150-volt supply voltage through load resistor R1 and is coupled to the control grid of the "triode" section of pentode P2 through the network comprising resistor R2 and capacitor C1, in parallel, and via conductor 105. Similarly, and symmetrically, the "triode-section" plate 104 of pentode P2 is connected to a positive 150-volt supply voltage through load resistor R3 and is coupled to the control grid of the triode section of pentode P1 through the network comprising resistor R4 and capacitor C2 and via conductor 106. Since, as will be seen hereinafter, the circuits are preferably triggered by pulses of short duration, capacitors C1 and C2 are provided to obviate the difficulties arising from interelectrode capacitance. To provide the necessary operating grid voltages, control grid 101 of pentode P1 is connected to a negative 150-volt supply voltage through resistor R5, and the control grid 102 of pentode P2 is connected to this same source through resistor R6. This circuit is a conventional form of Eccles-Jordan trigger circuit as above described and, with proper parameters, will be operative to render the "triode" sections of pentodes P1 and P2 alternately conductive either upon the alternating application of potentials of opposite polarity to the control grid of one of the tubes or upon the alternate application of pulses of a single polarity to the control grids of the two "triode" sections.

Indicators may be provided to show in which of the stable states the trigger circuit is at any given time. These may be neon lights shunting the plate load resistors of the "triode" sections of one of the pentodes in each substage. Thus, neon light N1 is placed in shunt of resistor R1 and will glow only when the "triode" section of pentode P1 is conducting.

It may be noted at this time that the substage comprising pentodes P3 and P4 is interconnected identically with that above-described to provide a trigger circuit in that substage, and the same applies in each other substage which may be provided.

The remaining elements of each pentode, i. e., the third (suppressor) grid and the anode, in cooperation with the other elements which act conjointly as a cathode, form a gate circuit. Negative voltage is normally applied to the third grid of each of the pentodes to prevent plate current from flowing in the pentode regardless of the state of the "triode" section of that pentode, i. e., regardless of whether there is or is not a suitable potential on the first or control grid to cause current to flow between the second (screen) grid and cathode of that tube. If, while the triode section of any of the pentodes is conducting, a positive pulse be applied to the third grid of that pentode, plate current will momentarily flow. If, however, the positive pulse is applied to the third grid while the "triode" section of that pentode is not conducting, conduction through the tube is prevented and plate current will not flow. Therefore, these elements of each pentode act as a gate continuously operative to prevent plate-current flow, but operative to cause the plate current to flow only when the "triode" section or "trigger" section of that tube is conducting.

The input pulses controlling the above-described operation of the pentode may be applied through a triode serving as a buffer amplifier and phase inverter. Considering the substage comprising pentodes P1 and P2, additive pulses, i. e., pulses which add to the pulses already registered in the counter, are received at the "count" terminal 107 and are applied through capacitor C3 to the grid of triode B1. In the preferred embodiment, with the tube types herein employed and with the representative circuit parameters hereinafter disclosed, these pulses may be of negative 50-volt amplitude and of about 2 microseconds duration.

The anode of triode B1 is grounded through resistor R7, the cathode is connected to negative 150-volt supply through resistors R8 and R9, and the control grid is connected through resistor R10 to a point in the cathode circuit intermediate resistors R8 and R9. It may be noted that the value of resistor R8 is determined by the operating characteristics of tube B1, and may be omitted in some cases. The parameters of the circuit are so adjusted that in the normal or quiescent condition of triode B1, the plate potential, controlled by the potential drop across resistor R7, is such that the third (suppressor) grid of pentode P1 is held sufficiently negative relative to ground that no plate current will flow in that pentode, whatever the state of the "triode" section thereof, as above mentioned. For pentodes of the type 6AS6, a potential of about negative 15 volts will suffice. The cathode of triode B1 is coupled to the first grid (the control grid of the "triode" section) of pentode P2 through capacitor C4 and conductor 105.

Let it now be assumed that the "triode" sections of pentodes P2 and P4 are conducting and that the "triode" sections of pentodes P1 and P3 are not conducting. The condition of any flip-flop or trigger circuit in which the lower tube (P2, P4, etc.) is conducting and in which the upper tube (P1, P3, etc.) is not conducting, may hereinafter be referred to as the "zero" state of the flip-flop or trigger circuit, while the opposite condition may be called the "one" state. When a negative counting pulse is applied to the grid of tube B1 through capacitor C3, current flow through that tube will be reduced with a consequent momentary rise in anode potential and momentary reduction of cathode potential thereof. With the trigger circuit in the substage comprising pentodes P1 and P2 in the "zero" state, the momentary rise in anode potential of tube B1, as applied to the third grid of pentode P1, is ineffective to cause plate current to flow in tube P1 since the "triode" section of that tube is not conducting. The momentary reduction of cathode potential of tube B1 is applied as a negative pulse through capacitor C4, conductor 105, and to the control grid of the "triode" section of tube P2. This pulse is sufficient to cut off the "triode" section of tube P2 and to render the "triode" section of tube P1 conductive in the manner hereinbefore described. By this action, the substage comprising tubes P1 and P2 is triggered to the "one" state.

It may be collaterally remarked at this time that the pulse duration must be short enough so that the third (suppressor) grid of tube P1 will have reverted to its normal negative potential by the time the "triode" section of that tube has been rendered conductive, i. e., the pulse duration should be shorter than the transfer time of the flip-flop.

The next negative pulse received at the "count"

terminal 107 will be amplified by tube B1 and transmitted through capacitor C4 to the control grid of tube P2, but since the "triode" section of pentode P2 is already below cut-off, that pulse will be ineffective to produce any change. The incoming pulse will also, as before, be amplified and inverted by triode B1 and applied to the third grid of pentode P1. Since the "triode" section of that tube is now conducting, this pulse will be effective to cause plate current to flow from the 150-volt battery, resistor R11, and to the anode of tube P1. Due to the potential drop across resistor R11, a negative pulse will be transmitted through capacitor 65 to the grid of triode B2.

It may be seen at this time that, assuming the trigger circuit to be in the "zero" state, the first incoming pulse to be counted will serve to trigger the circuits of the first substage to the "one" state, and the second incoming pulse will then be gated through to the next substage. The circuits of each substage are identical. In the second depicted substage, pentodes P3 and P4 are the correlatives of pentodes P1 and P2, and triode B2 is the correlative of triode B1. As will be seen hereinafter, triode B4 in the second substage is the correlative of triode B5 in the first shown substage, triode B3 in the next succeeding substage or stage is the correlative of triodes B1 and B2, and triode B6 in the next preceding substage or stage is the correlative of triodes B4 and B5.

The receipt of the second pulse to be counted affects the second substage in the same manner that the first pulse affected the first substage as above described, i. e., it triggers the second substage to its "one" state wherein the "triode" section of pentode P3 is rendered conducting. The third pulse to be counted is gated through pentode P1 of the first substage, and is amplified and inverted by tube B2 and applied to the third (suppressor) grid of pentode P3 to open the additive gate of the second substage. A negative pulse will thereby be applied through capacitor C6 to the grid of triode B3 in the next substage. The arrows at the anode and cathode of tube B3 indicate connections to pentodes in the next substage or stage correlative to pentodes P1 and P2 or P3 and P4.

Therefore, with the depicted circuits being taken to represent one stage of a counter for the scale of three, the count in the stage is registered in accordance with the following table in which "On" or "Off" indicates whether the "triode" section of the pentode is conducting or non-conducting:

| Count | P1 | P2 | P3 | P4 |
|---|---|---|---|---|
| 0 | off | on | off | on |
| 1 | on | off | off | on |
| 2 | on | off | on | off |

The negative pulse at the grid of tube B3, resulting from the receipt of the third add pulse, is also applied, via that grid and through capacitor C7, to the control grid of triode T1. Triode T1 and its correlative triode T2, each in cathode follower connection, are used to provide reset signals upon completion of the count in the stage. The anode of tube T1 is connected to positive 75-volt battery, and the cathode is connected to negative 150-volt battery through resistor R12. The control grid is connected to positive 75-volt battery through resistor R13 and to negative 150-volt battery through resistor R14. The value of resistors R13 and R14 is so adjusted that, due to the voltage drop across resistor R12, the cathode of triode T1 will normally be a few volts—such as 10—positive relative to ground. Thus, a positive potential will be applied, via conductor 108, to the high impedance side of rectifiers D1 and D3. These elements may be dry rectifiers, crystal diodes, gaseous diodes, etc., and are connected so that they present a low impedance to conventional current flow through them and toward the cathode of tube T1. The low-impedance side of rectifier D1 is connected to the first (control) grid 101 of pentode P1, and the low impedance side of rectifier D3 is connected to the first (control) grid of pentode P3. These control grids operate between ground potential and some point considerably below ground potential. Therefore, the rectifiers D1 and D3 are always biased at least ten volts in the reverse direction. With this reverse potential, rectifiers D1 and D3 represent relatively high resistances which join at the cathode of tube T1. Since tube T1 is a cathode follower, the effective impedance at its cathode is low. There is, therefore, normally little chance of coupling between the first and second trigger circuits or "flip-flops" through these biased rectifier paths.

When a negative pulse appears on the control grid of tube T1, however, the cathode of that tube repeats the negative pulse due to the momentary reduced potential drop through resistor R12. Since both pentodes P1 and P3 are "on" at this time of the cycle, the first (control) grids thereof are at a potential near ground. The pulse from the cathode of tube T1 can then pull the rectifiers D1 and D3 negative and well below the point where they become low impedance paths to the first (control) grid of pentodes P1 and P3. These first grids will then be driven to a negative potential by the low impedance generator represented by the cathode output of tube P1, despite any effort of the higher impedance generator, represented by the second grids ("anodes" of the "triode" sections) of tubes P2 and P4 to hold them positive. Therefore, this third negative pulse will cause a resetting to occur by initiating the cutting off of tubes P1 and P3 to restore the stage to the assumed initial condition in which pentodes P2 and P4 were conducting.

As hereinbefore mentioned, the circuit is entirely symmetrical as between "adding" and "subtracting" or "counting" and "uncounting." Pulses appearing at the "uncount" terminal 109 are effective in a manner identical with that described in regard to additive pulses, but produce a result exactly opposite. Thus, assume again that the circuit is initially in the condition 0 as shown in the first line of the above table. A negative pulse on "uncount" terminal 109 will pass through the open gate of tubes P4 and P2, and be applied through triode B6 as a "carry" to the next preceding substage or stage. This pulse will also be applied to the grid of triode T2 to cut off pentodes P2 and P4 in a manner similar to that above described for the additive pulse resetting operation. The depicted stage is then in the condition 2 according to the above table, i. e., in the cyclic arithmetic of a single stage, one less than zero. The next negative pulse at the "uncount" terminal 109 will cut off pentode P3, rendering pentode P4 conductive, leaving the stage in condition 1 according to the table. The next negative pulse will cut off pentode P1 and render pentode P2 conductive, leaving the stage again in the condition 0. These operations are completely symmetrical to the forward counting cycle.

It may be noted that to draw the diagram of one stage of a counter for any base B, one simply continues the chain of pentode flip-flops and triode buffer amplifiers to include B−1 flip-flops, and then drives the reset tubes T1 and T2 from the plates of the right-hand upper pentode and the left-hand lower pentode. The inner grids of all upper pentodes are connected through rectifiers to the cathode of reset tube T1, and symmetrically below.

The B-series and T-series triodes could all conveniently be half-sections each of double triodes such as type 2C51. The following are exemplary circuit values for 2C51 double triodes, 6AS6 pentodes, and the supply voltages shown:

| | | |
|---|---|---|
| R1 | ohms | 20,000 |
| R2 | do | 40,000 |
| R5 | do | 75,000 |
| R7 | do | 4,000 |
| R8 | do | 0 |
| R9 | do | 12,000 |
| R10 | do | 200,000 |
| R11 | do | 20,000 |
| R12 | do | 15,000 |
| R13 | do | 200,000 |
| R14 | do | 500,000 |
| C1 | micromicrofarads | 50 |
| C3 | do | 250 |
| C4 | do | 10 |
| C5 | do | 250 |

The rectifiers may be crystal diodes of Western Electric type 400A or Sylvania type 1N39. The circuit elements not mentioned in the above list appear in positions similar or symmetrical to the position of some element above listed.

It is to be understood that the suggested circuit parameters, tube types, and polarities of signal voltages, are purely exemplary. It is further to be understood that the above-described arrangements are illustrative of the application of the principles of the invention. Numerous other arrangements may be devised by those skilled in the art without departing from the spirit and scope of the invention.

What is claimed is:

1. A bidirectional pulse-counting circuit comprising a plurality of trigger circuits each having two stable states, an additive impulse input connected solely to the first of said trigger circuits, a subtractive impulse input connected solely to the last of said trigger circuits, the first of said trigger circuits when in one of said stable states being operative in response to a pulse on said additive impulse input to transfer to the other stable state, means individual to each of said trigger circuits when the state of the associated trigger circuit has been transferred for transmitting a pulse from said additive impulse input through all the preceding trigger circuits the state of which has been transferred to the next succeeding trigger circuit, the last of said trigger circuits when in one of said stable states being operative in response to a pulse on said subtractive impulse input to transfer to the other stable state, and means individual to each of said trigger circuits when the state of the associated trigger circuit has been transferred for transmitting a pulse from said subtractive impulse input through all the succeeding trigger circuits the state of which has been transferred to the next preceding trigger circuit.

2. A pulse-counting circuit comprising a plurality of trigger circuits each having a first and a second stable state, pulse transmitting means individual to each of said trigger circuits, each of said trigger circuits when in said first stable state being operative in response to a pulse from its associated transmitting means to transfer to said second stable state, and a gate circuit individual to and integral with each of said trigger circuits operative when the associated trigger circuit is in said second stable state and in response to a pulse from said transmitting means for transmitting a pulse to the next adjacent trigger circuit.

3. A pulse-counting circuit comprising a plurality of trigger circuits each having a first and a second stable state, pulse transmitting means individual to each of said trigger circuits, each of said trigger circuits when in said first stable state being operative in response to a pulse from its associated transmitting means to transfer to said second stable state but when in said second stable state being inoperative in response to a pulse from its associated transmitting means to transfer to said first stable state, and a gate circuit individual to and integral with each of said trigger circuits operative when the associated trigger circuit is in said second stable state and in response to a pulse from said transmitting means for transmitting a pulse to the next adjacent trigger circuit.

4. In a pulse-counting circuit, a pair of multielectrode electron discharge devices, means interconnecting three of said electrodes of each of said devices to form a trigger circuit, pulse input means, pulse transmitting means comprising an electron discharge device individual to said pair of devices and controlled by said pulse input means for applying a pulse to said interconnecting means to transfer conduction from one of said devices to the other of said devices, and means including said pulse transmitting means for normally applying a potential to a fourth one of said electrodes in at least one of said devices for preventing conduction through a fifth one of said electrodes in said at least one of said devices.

5. In a pulse-counting circuit, a pair of multielectrode electron discharge devices, means interconnecting three electrodes of each of said devices to form a trigger circuit, pulse input means, pulse transmitting means comprising an electron discharge device individual to said pair of devices and controlled by said pulse input means for applying a pulse to said interconnecting means to transfer conduction from one of said devices to the other of said devices, and means including said pulse transmitting means for normally applying a potential to a fourth one of said electrodes in each of said devices preventing conduction through a fifth one of said electrodes in each of said devices.

6. In a pulse-counting circuit, pulse input means, pulse transmitting means comprising an electron discharge device controlled by said pulse input means, a pair of electron discharge devices each having an anode, a cathode and three grids, and a pair of impedance branches interconnecting the second one of said grids of each of said devices to the first one of said grids of the other of said devices to sustain the circuit in either of two alternative states and selectively conditionable for reversal from either state to the other in response to a pulse from said pulse transmitting means, and means including said pulse transmitting means for normally applying a potential to the third one of said grids in at least one of said devices preventing anode current from flowing in said at least one of said devices.

7. In a pulse-counting circuit, a pair of multielectrode electron discharge devices, means interconnecting three of said electrodes of each of said devices to form a trigger circuit, pulse input means, pulse transmitting means comprising an electron discharge device individual to said devices and controlled by said pulse input means for applying a pulse to said interconnecting means to transfer conduction from one of said devices to the other of said devices, and means including said pulse transmitting means for normally applying a potential to a fourth one of said electrodes in at least one of said devices preventing conduction through a fifth one of said electrodes in said one of said devices and operative under the control of said pulse input means to apply a potential to said fourth one of said electrodes permitting conduction through said fifth one of said electrodes.

8. In a pulse-counting circuit, pulse input means, pulse transmitting means comprising an electron discharge device controlled by said pulse input means, a pair of electron discharge devices each having an anode, a cathode and three grids, and a pair of impedance branches interconnecting the second one of said grids of each of said devices to the first one of said grids of the other of said devices to sustain the circuit in either of two alternative states and selectively conditionable for reversal from either state to the other in response to a pulse from said pulse transmitting means, and means including said pulse transmitting means for normally applying a potential to the third one of said grids in at least one of said devices preventing anode current from flowing in said at least one of said devices and operative under the control of said pulse input means to apply a potential to said third one of said grids permitting anode current to flow.

9. In a pulse-counting circuit, pulse input means, pulse transmitting means comprising an electron discharge device controlled by said pulse input means, a pair of multielectrode electron discharge devices, and means interconnecting three of the electrodes of each of said devices to form a trigger circuit responsive to a pulse from said pulse transmitting means to transfer the conduction from between two of said three electrodes in one of said devices to two of said three electrodes in the other of said devices, and means including said pulse transmitting means for normally applying a potential to a fourth one of the electrodes of at least one of said devices for preventing current flow through a fifth one of the electrodes of said device and operative when conduction exists between said two of the electrodes in said at least one of said devices and under the control of said pulse input means to cause current to flow through said fifth electrode of said at least one of said devices.

10. In a pulse-counting circuit, a plurality of trigger circuits having a first and a second stable state, each of said trigger circuits being responsive to a first received pulse to transfer from said first stable state to said second stable state, means individual to each of said trigger circuits operative when the associated trigger circuit is in said second stable state and in response to a received pulse for transmitting a pulse to the next adjacent trigger circuit, and means operative in response to the first pulse transmitted by the one of said means individual to the last of said trigger circuits to transfer all of said trigger circuits to said first stable state, the last-mentioned means comprising a circuit including a rectifier individual to each of said trigger circuits.

11. In a pulse-counting circuit, a plurality of trigger circuits each having a first and a second stable state, each of said trigger circuits being responsive to a first received pulse to transfer from said first stable state to said second stable state, first means individual to each of said trigger circuits operative when the associated trigger circuit is in said second stable state and in response to a received pulse for transmitting a pulse to the next adjacent trigger circuit, a rectifier individual to and connected to each of said trigger circuits, and means operative in response to the first pulse transmitted by the one of said first means individual to a certain one of said trigger circuits to apply a pulse through said rectifiers to transfer each of said trigger circuits to said first stable state.

12. In a pulse-counting circuit, a plurality of trigger circuits each having a first and a second stable state, each of said trigger circuits being responsive to a first received pulse to transfer from said first stable state to said second stable state, first means individual to each of said trigger circuits operative when the associated trigger circuit is in said second stable state and in response to a received pulse for transmitting a pulse to the next adjacent trigger circuit, a rectifier individual to and connected to each of said trigger circuits, and means normally biasing said rectifiers reversely and operative in response to the first pulse transmitted by the one of said first means individual to a certain one of said trigger circuits to apply a pulse through said rectifiers to transfer each of said trigger circuits to said first stable state.

13. A pulse-counting circuit comprising a plurality of trigger circuits each having a first and a second stable state, each of said trigger circuits when in said first stable state being operative in response to a pulse to transfer to said second stable state, a gate circuit individual to each of said trigger circuits and controlled by the state of the trigger circuit to which it is individual, an electron discharge device individual to each of said trigger circuits and operative in response to each pulse applied thereto to apply a pulse to both the trigger circuit and the gate circuit to which said device is individual, each of said gate circuits being operative when the trigger circuit to which said gate circuit is individual is in said second stable state and in response to the pulse applied thereto by the one of said electron discharge devices individual thereto for applying a pulse to the electron discharge device individual to the next adjacent one of said trigger circuits.

14. A pulse-counting circuit comprising a plurality of trigger circuits each having a first and a second stable state, each of said trigger circuits when in said first stable state being operative in response to a pulse to transfer to said second stable state but when in said second stable state being inoperative to transfer to said first stable state, a gate circuit individual to and integral with each of said trigger circuits and controlled by the state of the trigger circuit to which said gate circuit is individual, an electron discharge device individual to each of said trigger circuits and operative in response to each pulse applied thereto to apply a pulse to both the trigger circuit and the gate circuit to which said device is individual, each of said gate circuits being operative when the trigger circuit to which said gate circuit is individual is in said second stable state and in response to the pulse applied thereto by the one of said electron discharge devices individual thereto for applying a pulse to the electron discharge device individual to the next adjacent one of said trigger circuits.

15. A pulse-counting circuit comprising a plurality of trigger circuits each having a first and a second stable state, two gate circuits individual to each of said trigger circuits and each controlled by the state of the trigger circuit to which said gate circuit is individual, and an electron discharge device individual to each of said gate circuits, each of said devices being operative in response to each pulse applied thereto to apply a pulse both to the trigger circuit and to the gate circuit to which said device is individual, each of said trigger circuits being responsive to a pulse from one of the devices individual thereto to shift from said first to said second stable state only and responsive to a pulse from the other of the devices individual thereto to shift from said second to said first stable state only, one of said gate circuits being operative when the trigger circuit to which it is individual is in one of said stable states and in response to the pulse applied thereto by the one of said devices which is individual thereto for applying a pulse to the electron discharge device individual to the next succeeding trigger circuit, the other of said gate circuits being operative when the trigger circuit to which it is individual is in the other of its stable states and in response to the pulse applied thereto by the one of said devices which is individual thereto for applying a pulse to the electron discharge device individual to the next preceding trigger circuit.

BROCKWAY McMILLAN.

References Cited in the file of this patent

UNITED STATES PATENTS

| Number | Name | Date |
|---|---|---|
| 2,402,989 | Dickinson | July 2, 1946 |
| 2,422,698 | Miller | June 24, 1947 |
| 2,427,533 | Overbeck | Sept. 16, 1947 |
| 2,436,482 | Miller et al. | Feb. 24, 1948 |
| 2,462,275 | Morton et al. | Feb. 22, 1949 |
| 2,476,303 | Kalfaian | July 19, 1949 |
| 2,527,633 | Grignon | Oct. 31, 1950 |
| 2,536,916 | Dickinson | Dec. 21, 1945 |

OTHER REFERENCES

Reversible Decade Counting Circuit, Victor H. Regener, The Review of Scientific Instruments, volume 17, No. 10, October, 1946.